United States Patent
Furuta et al.

[15] 3,642,137
[45] Feb. 15, 1972

[54] WOOL-WASHING WASTE-LIQUID TREATMENT APPARATUS

[72] Inventors: Taizo Furuta; Yuichi Otsuka; Kiyoshi Mizukawa, all of Tokyo-to, Japan

[73] Assignee: Daito Boshoku Kabushiki Kaisha (a/k/a Daito Woolenspinning & Wearing Co., Ltd.), Tokyo-to, Japan

[22] Filed: Dec. 15, 1970

[21] Appl. No.: 98,238

[52] U.S. Cl. ...............................210/152, 203/10, 203/43, 210/180, 210/195
[51] Int. Cl. .......................................................B01d 21/10
[58] Field of Search ..................210/152, 180, 187, 195, 511; 203/10, 43, 28, 38

[56] References Cited

UNITED STATES PATENTS

| | | | |
|---|---|---|---|
| 1,199,861 | 10/1916 | Barstow et al. | 210/152 X |
| 1,853,871 | 4/1932 | Mertens | 210/71 X |
| 2,360,811 | 10/1944 | Kelly et al. | 210/152 |
| 3,304,991 | 2/1967 | Greenfield | 210/152 X |

*Primary Examiner*—John Adee
*Attorney*—Robert E. Burns and Emmanuel J. Lobato

[57] ABSTRACT

A wool-washing waste-liquid treatment apparatus, wherein waste-liquid is once stored in a precipitation vessel and is separated into wool fat, suint and sand, then the mixture liquid of said wool fat and suint is supplied into a vapor-producing device and heated there whereby said mixture liquid is separated into vapor and sludge, the vapor is circulated to said wool-washing device, the sludge is poured into an agitating vessel, a wool fat solvent is added to and agitated with the sludge, the thus-agitated sludge is transferred into a separating vessel, so that the wool grease and impurity are separated from each other.

1 Claim, 1 Drawing Figure

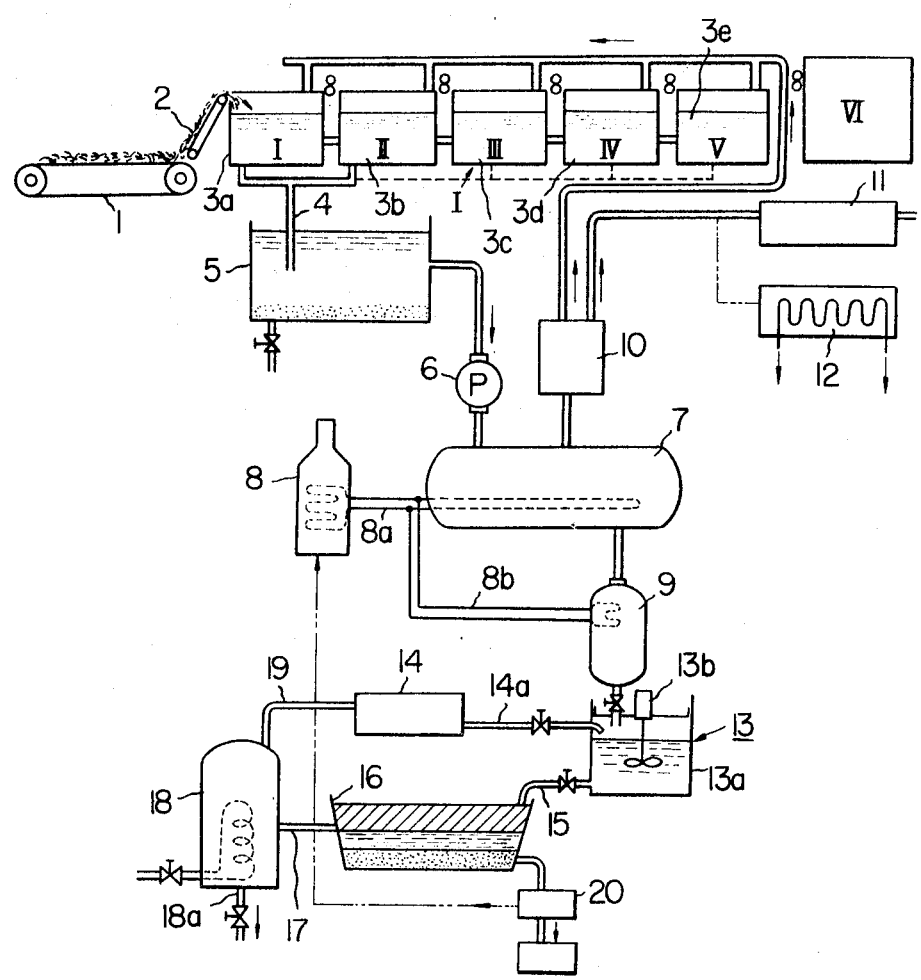

WOOL-WASHING WASTE-LIQUID TREATMENT APPARATUS

BACKGROUND OF THE INVENTION

The present invention relates to an improved apparatus wherein waste-liquid used for washing raw wool is treated thereby to recover wool grease contained in the waste-liquid.

Heretofore, wool fat (or so-called wool wax) contained much in the waste-liquid contaminated through the course of wool-washing has been recovered by means of a centrifuge. However, the recovery condition of the wool fat has not been sufficiently effective. Further, the waste-liquid has been not only waste in the economical view point but also thrown into a river, and therefore the waste-liquid has caused the public hazardous conditions.

SUMMARY OF THE INVENTION

It is accordingly an object of the present invention to provide an improved apparatus by which both the recovery of wool grease which is widely used as a raw material of cosmetics and the treatment of the waste-liquid are simultaneously accomplished without causing the disadvantages in the conventional systems.

The above and other objects of the invention have been attained by the apparatus comprising, in combination, a wool-washing device, a precipitation vessel for receiving wool-washing waste-liquid produced in said wool-washing device, a vapor-producing device connected to said precipitation vessel to receive the waste-liquid stored in said vessel and acting to heat the received waste-liquid thereby to separate said liquid into vapor and sludge, a vapor-and-water separating device connected to said vapor-producing device to receive vapor therefrom thereby to separate vapor from accompanied water, means adapted to circulate said separated vapor from said vapor-and-water separating device into said wool-washing device, a continuous blow device connected to said vapor producing device so as to receive said sludge, an agitating device connected to said blow device so as to be poured therein with the sludge from said blow device, a condenser connected to said agitating device to supply a solvent into said agitating device thereby to mix and agitate the sludge with said solvent in said agitating device, a separating vessel connected to said agitating device so as to receive said mixture from said agitating device thereby to separate said mixture into woolen fat solvent and impurity, a vacuum evaporator connected to said separating vessel to receive said woolen fat solvent and adapted to separate said fat solvent into solvent and wool grease, and means adapted to circulate said separated solvent into said condenser.

The characteristic feature and function of the present invention will be better understood from the following description taken in connection with the accompanying drawing.

BRIEF DESCRIPTION OF THE DRAWING

In the drawing, the FIGURE shows a schematic and systematic diagram illustrating an embodiment of the present invention.

DETAILED DESCRIPTION OF THE INVENTION

Referring now to the accompanied drawing, an example of the wool-washing waste-liquid treatment system according to the present invention, will be explained as follows:

In the drawing, a reference numeral 1 indicates a conveyor which is horizontally installed and adapted to transfer raw wool. The raw wool is thrown by a raw-wool-throwing conveyor 2 arranged with a gradient at the tail end part of said conveyor 1, into the vessel 3a of a wool-washing device I which is provided in line with the conveyor 2. The raw wool which has been washed with a detergent such as soap soda solution in the first wool-washing vessel is successively transferred to other wool-washing vessels 3b, 3c, 3d, and 3e and washed with water therein and then the thus-washed wool is taken out of the wool-washing device V. This taken-out wool is dried in a drying device VI and then is carried to the following process stage.

On the other hand, the waste-liquid used for washing the raw wool and present in the wool washing vessels is temporarily stored in a precipitation vessel 5 passing through a discharge pipe 4 communicated with the bottoms of the wool washing vessels. Therefore, the waste-liquid transferred into said precipitation vessel 5 is precipitated therein in the state separated into woolen fat, suint (salts) and sand after a certain period of time. Next, the colloidal waste-liquid comprising said woolen fat and suint is forcibly transferred into a vapor-producing device 7 by means of a pump 6. The waste-liquid in the vapor-producing device 7 is heated at a high temperature and is separated into vapor having fume, and sludge.

Further, in the vapor-producing device 7, said waste-liquid may be directly heated, or a heat transfer liquid may be used to heat the waste-liquid so that said sludge is not stuck on the peripheral surface of a pipe.

The heat-transfer-liquid in a boiler of a heat-transfer-liquid-heating device 8 is heated through a liquid-transferring pipe 8a, and the thus-heated heat-transfer-liquid is circulated into a continuous blow device 9 through a branch pipe 8b communicated with the continuous blow device 9 which will be described later.

Now, the vapor separated in the vapor-producing device 7 is circulated into all wool-washing vessels of the wool-washing devices I, II, III, IV, and V through a vapor-and-water-separating device 10 which is adapted to separate vapor and water. The excessive vapor separated in the vapor-producing device 7 contains acetic acid, propionic acid, and other low class fatty acids, and therefor is malodorous. The malodorous vapor is deodorized by being passed through a deodorizing device 11 comprising a filter containing activated charcoal or any other deodorizing agents, and then may be supplied to said drying device VI, or may be converted into hot water through a heat exchanger 12.

On the other hand, the sludge separated in said vapor-producing device 7 becomes a fluid the main component of which is woolen fat and which is relatively low in viscosity, and is stored in the lower portion of the vapor-producing device 7. By transferring the thus stored fluid into the continuous blow device 9 and then heating it there, the sludge becomes a mixture liquid, the mixing ratio of which is approximately 60 of water, 30 of woolen fat, and 10 of suint, sand, and the like.

Then, the sludge present in the continuous blow device 9 is furnished into an agitating vessel 13a of an agitating device 13, and is forcibly and continuously agitated by an agitator 13b to be mixed with a woolen fat solvent (which will be merely referred to as a solvent hereinafter) supplied through a supply pipe 14a from a condenser 14.

The ratio of the solvent supplied into the agitating vessel 13a is 3–10 of the solvent to 1 of the sludge. In addition, employed as the solvent is an organic solvent such as trichloroethylene, perchloroethylene, hexane, acetone, methyl ethylen ketone, benzine, toluen, carbon tetrachloride, and the like. If alcohol and soda are added into the solvent, wool grease with better quality can be obtained. The mixture liquid obtained by mixing the sludge and the solvent in the agitating vessel 13a is transferred to a separating vessel 16 through a liquid-transferring pipe 15. The mixture liquid thus remained in the separating vessel 16 is separated into three layers, namely, a solvent layer containing wool fat, water layer, and impurity layer, due to the specific gravity thereof after a certain period of time. When hexane is, for instance, employed for the solvent, the hexane having a specific gravity lighter than that of water is separated to occupy the upper layer in the separating vessel 16 as shown in the drawing. The liquid separated in the separating vessel 16 and containing wool fat is transferred into a vacuum distillation device 18 through a connecting pipe 17. The solvent is evaporated from the thus transferred liquid in the vacuum distillation device 18, whereby wool grease is left therein. The thus-left wool grease is collected through a discharge means 18a provided below the vacuum distillation device 18.

On the other hand, the impurity precipitated down in the lower portion of the separating vessel 16 is of an organic material, and therefore may be abandoned through a drying device 20. The dried impurity may be used as the fuel for the heat-transfer, liquid-heating device 8.

If the wool grease were overheated in the vacuum distillation device 18 in the process of the wool grease collection, the wool grease would be deteriorated in color quality. Accordingly, in case that the solvent such as hexane the boiling point of which is 65° C. is used, the vacuum distillation should be conducted at a relatively low temperature.

According to the present invention, as described above, the wool grease contained in the waste-liquid used for washing wool can be effectively recovered. Therefore, it can be understood that the present invention contributes to the prevention of the public hazard such as river contamination. Furthermore; according to the present invention, the waste-liquid heated in the vapor-producing device is separated into vapor and sludge, the thus-separated vapor is circulated into the wool-washing device while the thus-separated sludge is agitated with the solvent in the agitating device into which this solvent being supplied, the sludge agitated thus with the solvent is separated in the separating vessel, and further the solvent containing the wool fat is separated into the solvent and the wool grease by the vacuum distillation device 18. Accordingly, the present invention has outstanding advantages that not only the solvent is recovered without loss, but also the wool grease is recovered with efficiency higher than that found in the conventional centrifuge of this type.

It is intended that all matter contained in the foregoing description and in the drawing shall be interpreted as illustrative only not as limitative of the invention.

What we claim is:

1. A wool-washing waste-liquid treatment apparatus, which comprises, in combination, a wool-washing device, a precipitation vessel for receiving wool-washing waste-liquid produced in said wool-washing device, a vapor-producing device connected to said precipitation vessel to receive the waste-liquid stored in said vessel and acting to heat the received waste-liquid thereby to separate said liquid into vapor and sludge, a vapor-and-water separating device connected to said vapor-producing device to receive vapor therefrom thereby to separate vapor from accompanied water, means adapted to circulate said separated vapor from said vapor-and-water separating device into said wool-washing device, a continuous blow device connected to said vapor-producing device so as to receive said sludge, an agitating device connected to said blow device so as to be poured therein with the sludge from said blow device, a condenser connected to said agitating device to supply a solvent into said agitating device thereby to mix and agitate the sludge with said solvent in said agitating device, a separating vessel connected to said agitating device so as to receive said mixture from said agitating device thereby to separate said mixture into woolen fat solvent and impurity, a vacuum evaporator connected to said separating vessel to receive said woolen fat solvent and adapted to separate said fat solvent into solvent and wool grease, and means adapted to circulate said separated solvent into said condenser.

* * * * *